Oct. 3, 1950     H. C. HARNISH, JR., ET AL     2,524,168
ADJUSTABLE PIPE SQUARE
Filed April 5, 1948     2 Sheets-Sheet 2
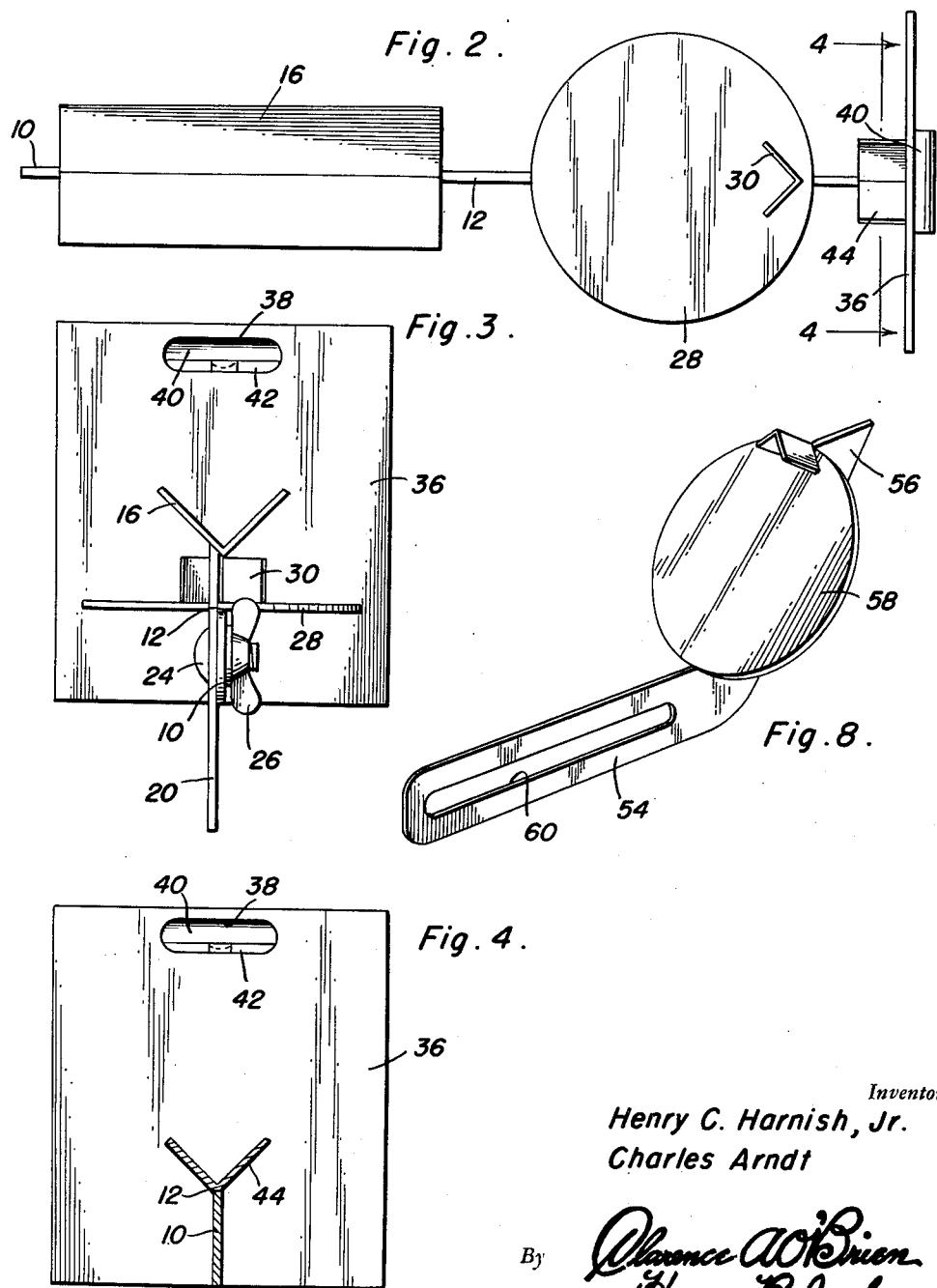
Inventors
Henry C. Harnish, Jr.
Charles Arndt
By *Clarence A. O'Brien and Harvey B. Jacobson*
Attorneys Patented Oct. 3, 1950

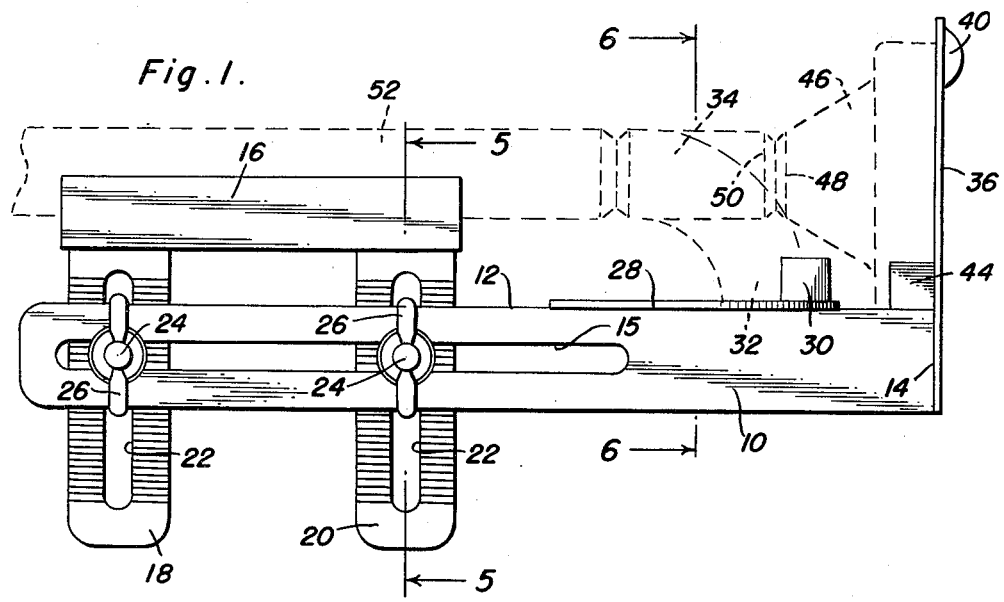
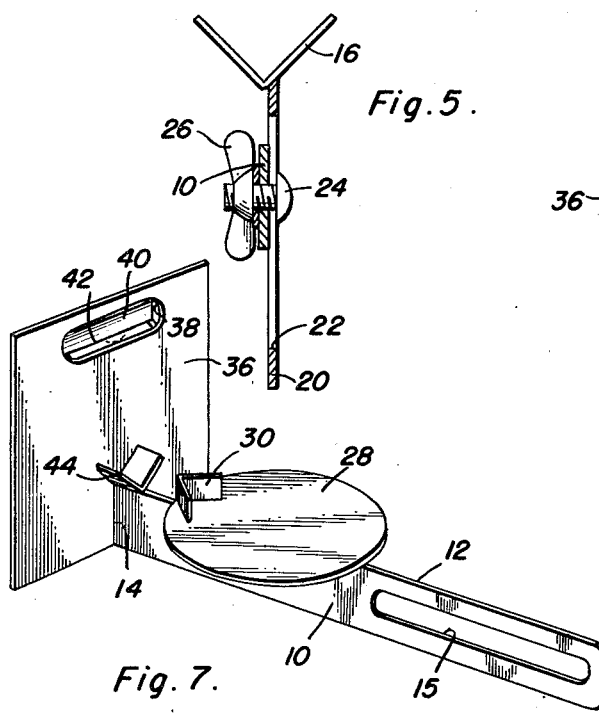

2,524,168

UNITED STATES PATENT OFFICE 2,524,168

ADJUSTABLE PIPE SQUARE

Henry C. Harnish, Jr., Denville, and
Charles Arndt, Boonton, N. J.

Application April 5, 1948, Serial No. 18,998

3 Claims. (Cl. 113—102)

1

This invention relates to new and useful improvements in devices for holding pipe sections in position for welding and the primary object of the present invention is to provide a device for retaining pipe sections of various sizes and shapes together preparatory to brazing, welding, sweating or the like.

Another important object of the present invention is to provide an adjustable pipe square including a main pipe holding member, and novel and improved pipe section engaging means which are disposed at a predetermined angle relative to the holding member and which cooperates with the holding member for the positioning of a pair of pipe sections temporarily together during the fixing of the sections to each other in a precise and convenient manner.

A further object of the present invention is to provide a device for holding pipe sections together in situ for welding or the like including a main pipe section holding member, a support, and novel and improved means for adjustably securing the holding member relative to the support for accommodating various diameters of pipe sections.

A still further aim of the present invention is to provide an adjustable pipe square of the aforementioned character that is simple and pracical in construction, strong and reliable in use, small and compact in structure, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the present invention and showing in dotted lines the application thereto of a group of pipe sections in dotted lines;

Figure 2 is a top plan view of the present adjustable pipe square;

Figure 3 is an end view of the present adjustable pipe square;

Figure 4 is a transverse vertical sectional view taken substantially on the plane of section line 4—4 of Figure 2;

Figure 5 is a transverse vertical sectional view of the present invention taken substantially on the plane of section line 5—5 of Figure 1;

Figure 6 is a transverse vertical sectional view taken substantially on the plane of section line 6—6 of Figure 1;

2

Figure 7 is a perspective view of the present adjustable pipe square, and showing the pipe holding member removed therefrom; and, Figure 8 is a perspective view of the present adjustable pipe square in slightly modified form, and showing the pipe holding member removed therefrom.

Referring now to the drawings in detail, wherein for the purpose of illustration, there is disclosed a preferred embodiment of the present invention, the numeral 10 represents an elongated support arm, preferably rectangular in form having an upper longitudinal edge 12 and a transverse edge 14. The support arm 10 is also provided with a longitudinal slot 15.

Rigidly secured to and depending from the lower periphery of a substantially V-shaped pipe holding trough 16, is a pair of spaced parallel plates 18 and 20 having longitudinal openings or slots 22 that slidably receive bolts 24 which also enter the slot 15. Wing nuts 26 receivably engage the bolts 24 for holding the pipe holding trough 16 in a selected adjusted position relative to the support arm 10.

Secured by welding or any other suitable means to the upper longitudinal edge 12 of the support arm 10 is a preferably annular bearing plate 28 that is spaced parallel to the longitudinal axis of the support arm 10. A substantially V-shaped pipe section engaging member or stop 30 is fixed to the upper surface of the bearing plate 28 and receives one end 32 of an elbow pipe section 34 one extremity of which bears upon the plate 28.

Fixed to the transverse, substantially vertical edge 14 of the support arm 10, is an upstanding substantially rectangular bearing plate 36 that is perpendicular to the bearing plate 28. This latest bearing plate 28 is provided with an elongated slot or opening 38 that registers with a recess formed in a channeled holding member 40 which is fixed to the outer face of the bearing plate. A spirit level 42 is suitably mounted in the member 40 for indicating a substantially vertical position for the bearing plate 36 and a horizontal position for the bearing plate 28.

A substantially V-shaped pipe section holding member having upwardly diverging legs 44 is fixed to the inner face of the bearing plate 36 and the upper edge 12 of the support arm 10 and engages a suitable straight pipe section or more particularly a flange 46 having an end 48 that is to be welded, brazed or fixed to one end 50 of a pipe section 52 positioned in the trough 16.

Reference is now directed to Figure 8, wherein there is disclosed the present invention in slightly modified form. In this embodiment of the invention, the support arm 54 is angulated at one end to provide an upwardly and outwardly inclined end portion 56. Fixed to the end portion 56, is a preferably annular bearing plate 58 that is disposed at an angle of 45° relative to the longitudinal axis of the support arm 54.

The support arm 54 is formed with a longitudinal slot 60 that engages the bolts 24 previously referred to for adjustably securing the trough supporting straps 18 and 20.

Rigidly secured to the bearing plate 58, is a substantially V-shaped pipe section engaging member that engages one end of a 45° pipe elbow section for holding the same in position for welding to a further pipe section (not shown) which is disposed in the trough 16.

Having described the invention, what is claimed as new is:

1. A pipe square comprising an elongated flat support having a longitudinal slot therein, a substantially V-shaped pipe holding trough, a pair of flat arms fixed to and projecting laterally from the trough, said arms bearing against one face of said support, the apex of said trough being spaced directly above said support, said arms having slots therein, fasteners received in the slot provided in said support and the slots in said arms for adjusting the trough longitudinally and laterally with respect to said support, a bearing plate fixed to said support, and a stop member secured to and projecting laterally from said bearing plate.

2. A pipe square comprising an elongated support arm having first and second end portions and a longitudinal slot in its first end portion, a first bearing plate permanently fixed to the second end of said support arm and disposed perpendicular to the longitudinal axis of said support, a second bearing plate overlying said support arm and permanently attached to the second end portion of said support arm, a pipe holding trough overlying said support arm, a pair of parallel arms depending from said trough, each of said pair of arms having a slot therein disposed perpendicular to the axis of said trough and in registry with said slot in said support, and fasteners extending through the slots in said pair of arms and the slot in said support arm for adjusting the trough laterally and longitudinally of said support arm and relative to both of said bearing plates.

3. The combination of claim 2 wherein said trough is substantially V-shaped in cross-section, the apex of said trough being directly above said support arm, and a V-shaped pipe support secured to the first bearing plate and having its apex secured to the support arm.

HENRY C. HARNISH, Jr.
CHARLES ARNDT.

REFERENCES CITED

The following references are of record in the file of this patent:

UNITED STATES PATENTS

| Number | Name | Date |
|---|---|---|
| 288,035 | Dixon | Nov. 6, 1883 |
| 410,414 | Hall | Sept. 3, 1889 |
| 1,940,910 | Hickey | Dec. 26, 1933 |
| 2,323,039 | Hill | June 29, 1943 |
| 2,452,985 | Bourdette | Nov. 2, 1948 |
| 2,461,783 | Stark | Feb. 15, 1949 |